(12) United States Patent
Dix et al.

(10) Patent No.: US 9,819,174 B2
(45) Date of Patent: Nov. 14, 2017

(54) HOTSWAP OPERATIONS FOR PROGRAMMABLE LOGIC DEVICES

(71) Applicant: Lattice Semiconductor Corporation, Hillsboro, OR (US)

(72) Inventors: Christopher W. Dix, Hillsboro, OR (US); Cleo Mui, Beaverton, OR (US); Cheng-Jen Gwo, Beaverton, OR (US); Joel Coplen, Hillsboro, OR (US); Srirama Chandra, Beaverton, OR (US)

(73) Assignee: Lattice Semiconductor Corporation, Portland, OR (US)

( * ) Notice: Subject to any disclaimer, the term of this patent is extended or adjusted under 35 U.S.C. 154(b) by 254 days.

(21) Appl. No.: 14/609,181

(22) Filed: Jan. 29, 2015

(65) Prior Publication Data

US 2016/0226241 A1   Aug. 4, 2016

(51) Int. Cl.
*H02H 9/02* (2006.01)
*H02H 9/00* (2006.01)

(52) U.S. Cl.
CPC .................... *H02H 9/004* (2013.01)

(58) Field of Classification Search
CPC ............... H02H 9/004; H02H 9/025
See application file for complete search history.

(56) References Cited

U.S. PATENT DOCUMENTS

| | | | |
|---|---|---|---|
| 6,525,515 B1 | 2/2003 | Ngo et al. | |
| 7,358,712 B2 | 4/2008 | Shimizu et al. | |
| 8,278,997 B1 | 10/2012 | Kim et al. | |
| 2002/0166073 A1* | 11/2002 | Nguyen | G06F 1/28 713/300 |
| 2004/0012369 A1* | 1/2004 | Moore | B60L 11/1851 320/104 |
| 2005/0099751 A1* | 5/2005 | Kumagai | H03K 17/0828 361/100 |
| 2005/0269883 A1* | 12/2005 | Drader | G06F 1/26 307/131 |

(Continued)

OTHER PUBLICATIONS

Lattice Semiconductor Corporation, 5V and 3.3V Hot Swap Controller, Reference Design RD1057, Jul. 2009, pp. 1-6.

(Continued)

*Primary Examiner* — Thienvu Tran
*Assistant Examiner* — Tien Mai
(74) *Attorney, Agent, or Firm* — Michael Garrabrants (57) ABSTRACT

Techniques are provided to control hotswap operations with programmable logic devices (PLDs). In particular, a MOSFET is provided to limit an in-rush current drawn from a power supply by capacitive components of an electronic assembly when it is plugged into the live, power supply. A controller with an algorithm is provided to control the MOSFET based on the in-rush current detected at the MOSFET. As such, a feedback control loop is established to selectively bias the gate of the MOSFET based on the detected in-rush current. The algorithm may limit the in-rush current based on a Safe Operating Area (SOA) of the MOSFET. The hotswap process may include multiple phases each with a voltage and/or current limit modeling the voltages and currents of the SOA. The algorithm may transition through the phases with the respective current and/or voltage limits during the hotswap process.

17 Claims, 6 Drawing Sheets

(56) References Cited

U.S. PATENT DOCUMENTS

2013/0088278 A1    4/2013  Spalding, Jr. et al.

OTHER PUBLICATIONS

Lattice Semiconductor Corporation, 12V Hot Swap Controller with ispPAC-POWR1220AT8, Reference Design RD1068, Apr. 2010, pp. 1-13.
Linear Technology, LTC4210-1/LTC4210-2, Hot Swap Controller in 6-Lead SOT-23 Package, pp. 1-20.

\* cited by examiner

| Trip Point # | Trip Point (Amps) | $V_{DS}$ From 10ms SOA Limit Line Solved for Voltage $V = e^{\frac{\ln(\frac{A}{m})}{-b}}$ | Load Voltage $V_s - V_{DS}$ |
|---|---|---|---|
| 1 | 0.750 | 37.8 | -13.8 |
| 2 | 1.000 | 30.0 | -6.0 |
| 3 | 1.400 | 22.9 | 1.1 |
| 4 | 1.500 | 21.7 | 2.3 |
| 5 | 1.900 | 18.0 | 6.0 |
| 6 | 2.000 | 17.2 | 6.8 |
| 7 | 2.800 | 13.2 | 10.8 |
| 8 | 3.000 | 12.5 | 11.5 |
| 9 | 3.800 | 10.3 | 13.7 |
| 10 | 4.000 | 9.9 | 14.1 |
| 11 | 5.600 | 7.6 | 16.4 |
| 12 | 7.500 | 6.0 | 18.0 |
| 13 | 7.600 | 5.9 | 18.1 |
| 14 | 10.00 | 4.7 | 19.3 |
| 15 | 14.00 | 3.6 | 20.4 |
| 16 | 19.00 | 2.8 | 21.2 |

FIG. 7

HOTSWAP OPERATIONS FOR PROGRAMMABLE LOGIC DEVICES

TECHNICAL FIELD

The present invention relates generally to electronic devices and, more particularly, to hotswap operations performed with such devices, such as logic devices, mixed signal devices, and/or programmable logic devices.

BACKGROUND

Programmable logic devices (PLDs) (e.g., field programmable gate arrays (FPGAs)), complex programmable logic devices (CPLDs), field programmable system on a chips (FPSCs), or other types of electronic devices) may be implemented as part of an electronic assembly that is "hotswapped" by being plugged into a live power supply, such as a backplane. Typically, the electronic assembly has various capacitive components, such as an array of filters, bypass, and hold-up capacitors. The combined capacitive load of the capacitive components may act like a momentary short circuit when the electronic assembly is plugged in. If left unchecked, the in-rush current from the live power supply may damage certain components of the electronic assembly or cause power disruption to other devices connected at the backplane or power supply.

Typically, the hotswap device utilizes a transistor, such as a metal-oxide semiconductor field-effect transistor (MOSFET), to limit the in-rush current. In particular, during hotswap, the gate of a power MOSFET is slowly charged up from the power supply. The power MOSFET acts as a solid state switch to limit the in-rush current. However, the MOSFET needs to be selected and/or sized such that the maximum current and maximum voltage drop across drain to source do not exceed the safe operation area (SOA) of the MOSFET. This may result in an oversized power MOSFET that takes up space and is more costly.

BRIEF DESCRIPTION OF THE DRAWINGS

Embodiments of the present invention and their advantages are best understood by referring to the detailed description that follows. It should be appreciated that like reference numerals are used to identify like elements illustrated in one or more of the figures.

DETAILED DESCRIPTION

In accordance with various embodiments set forth herein, techniques are provided to implement hotswap operations in electronic devices, for example programmable logic devices (PLDs) or other programmable electronic devices in general. In particular, a MOSFET is provided to limit an in-rush current drawn from a live power supply by a capacitive load of the PLD when the PLD is plugged into the power supply. A controller is provided to control the MOSFET based on the in-rush current detected near the MOSFET. As such, a feedback control loop is established to selectively bias the gate of the MOSFET based on the detected in-rush current.

In an embodiment, the hotswap operations may limit the in-rush current based on a Safe Operating Area (SOA) of the MOSFET. In particular, the hotswap operations may include multiple phases each with a voltage and/or current limit modeling the voltages and currents of the SOA. The hotswap process may transition through the phases with the respective current and/or voltage limits. When a voltage limit is reached in a present phase, the hotswap process may transition to the next phase.

In an embodiment, a user interface is provided to set up the hotswap operations. The user interface may allow a user to enter hotswap parameters, such as a supply voltage of a power supply, a capacitive load of an electronic assembly, a type of MOSFET, and the like. In response to these inputs, a processor may determine a number of phases for the hotswap operations and voltage and/or current limits for each phase based on the hotswap parameters. After the design is finalized, the processor may configure the hardware circuit components based on the design to implement the hotswap operations.

Figure 1:
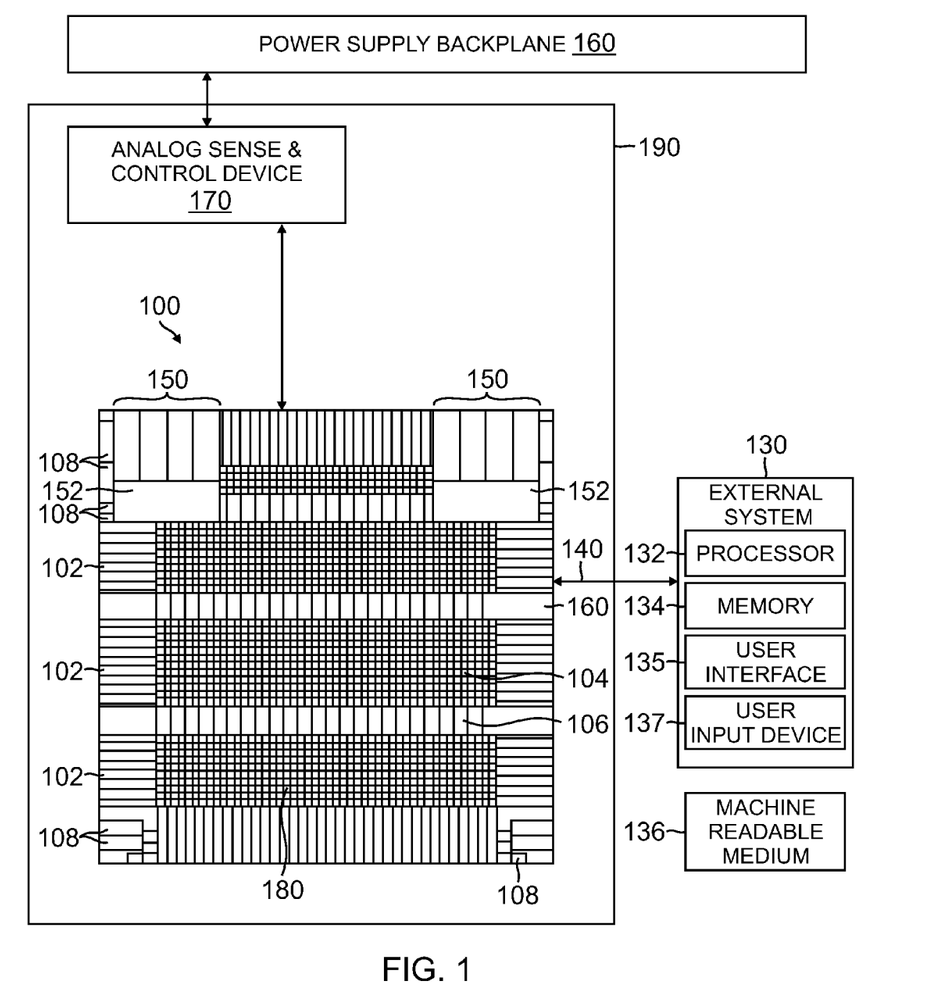
FIG. 1 illustrates a block diagram of an electronic assembly with configured to perform hotswap operations in accordance with an embodiment of the disclosure.

Referring now to the drawings, FIG. 1 illustrates a block diagram of an electronic assembly 190 in accordance with an embodiment of the disclosure. The electronic assembly 190 may include a PLD 100 (e.g., a field programmable gate array (FPGA)), a complex programmable logic device (CPLD), a field programmable system on a chip (FPSC), or other type of programmable device) generally includes input/output (I/O) blocks 102 and logic blocks 104 (e.g., also referred to as programmable logic blocks (PLBs), programmable functional units (PFUs), or programmable logic cells (PLCs)). The electronic assembly 190 also includes a hotswap interface between the PLD 100 and a power supply backplane 160, such as an analog sense and control device 170.

The power supply backplane 160 may be a live power supply. When the electronic assembly 190 is connected to or plugged into the power supply backplane 160, a momentary in-rush current may flow into the electronic assembly 190 drawn by a capacitive load of the electronic assembly 190. The electronic assembly 190 may implement hotswap operations to limit the in-rush current to protect, for example, the connectors of the electronic assembly 190 from excessive current and to prevent power disruption to other devices connected to the power supply backplane 160.

In PLD 100, I/O blocks 102 provide I/O functionality (e.g., to support one or more I/O and/or memory interface standards) for PLD 100, while programmable logic blocks 104 provide logic functionality (e.g., LUT-based logic or logic gate array-based logic) for PLD 100. Additional I/O functionality may be provided by serializer/deserializer (SERDES) blocks 150 and physical coding sublayer (PCS) blocks 152. PLD 100 also includes hard intellectual property core (IP) blocks 160 to provide additional functionality (e.g., substantially predetermined functionality provided in hardware which may be configured with less programming than logic blocks 104).

PLD 100 may also include blocks of memory 106 (e.g., blocks of EEPROM, block SRAM, and/or flash memory), clock-related circuitry 108 (e.g., clock sources, PLL circuits, and/or DLL circuits), and/or various routing resources 180 (e.g., interconnect and appropriate switching logic to provide paths for routing signals throughout PLD 100, such as for clock signals, data signals, or others) as appropriate. In general, the various elements of PLD 100 may be used to perform their intended functions for desired applications, as would be understood by one skilled in the art.

For example, I/O blocks 102 may be used for programming PLD 100, such as memory 106 or transferring information (e.g., various types of data and/or control signals) to/from PLD 100 through various external ports as would be understood by one skilled in the art. I/O blocks 102 may provide a first programming port (which may represent a central processing unit (CPU) port, a peripheral data port, an SPI interface, and/or a sysCONFIG programming port) and/or a second programming port such as a joint test action group (JTAG) port (e.g., by employing standards such as Institute of Electrical and Electronics Engineers (IEEE) 1149.1 or 1532 standards). I/O blocks 102 typically, for example, may be included to receive configuration data and commands (e.g., over one or more connections 140) to configure PLD 100 for its intended use and to support serial or parallel device configuration and information transfer with SERDES blocks 150, PCS blocks 152, hard IP blocks 160, and/or logic blocks 104 as appropriate.

It should be understood that the number and placement of the various elements are not limiting and may depend upon the desired application. For example, various elements may not be required for a desired application or design specification (e.g., for the type of programmable device selected).

Furthermore, it should be understood that the elements are illustrated in block form for clarity and that various elements would typically be distributed throughout PLD 100, such as in and between logic blocks 104, hard IP blocks 160, and routing resources 180 to perform their conventional functions (e.g., storing configuration data that configures PLD 100 or providing interconnect structure within PLD 100). It should also be understood that the various embodiments disclosed herein are not limited to programmable logic devices, such as PLD 100, and may be applied to various other types of programmable devices, as would be understood by one skilled in the art.

An external system 130 may be used to create a desired user configuration or design of PLD 100 and generate corresponding configuration data to program (e.g., configure) PLD 100. For example, external system 130 may provide such configuration data to one or more I/O blocks 102, SERDES blocks 150, and/or other portions of PLD 100. As a result, programmable logic blocks 104, routing resources 180, and any other appropriate components of PLD 100 may be configured to operate in accordance with user-specified applications.

In the illustrated embodiment, external system 130 is implemented as a computer system. In this regard, external system 130 includes, for example, one or more processors 132 which may be configured to execute instructions, such as software instructions, provided in one or more memories 134 and/or stored in non-transitory form in one or more non-transitory machine readable mediums 136 (e.g., which may be internal or external to system 130). For example, in some embodiments, external system 130 may run PLD configuration software, such as Lattice Diamond System Planner software available from Lattice Semiconductor Corporation of Hillsboro, Oreg. to permit a user to create a desired configuration and generate corresponding configuration data to program PLD 100.

External system 130 also includes, for example, a user interface 135 (e.g., a screen or display) to display information to a user, and one or more user input devices 137 (e.g., a keyboard, mouse, trackball, touchscreen, and/or other device) to receive user commands or design entry to prepare a desired configuration of PLD 100.

Figure 2:
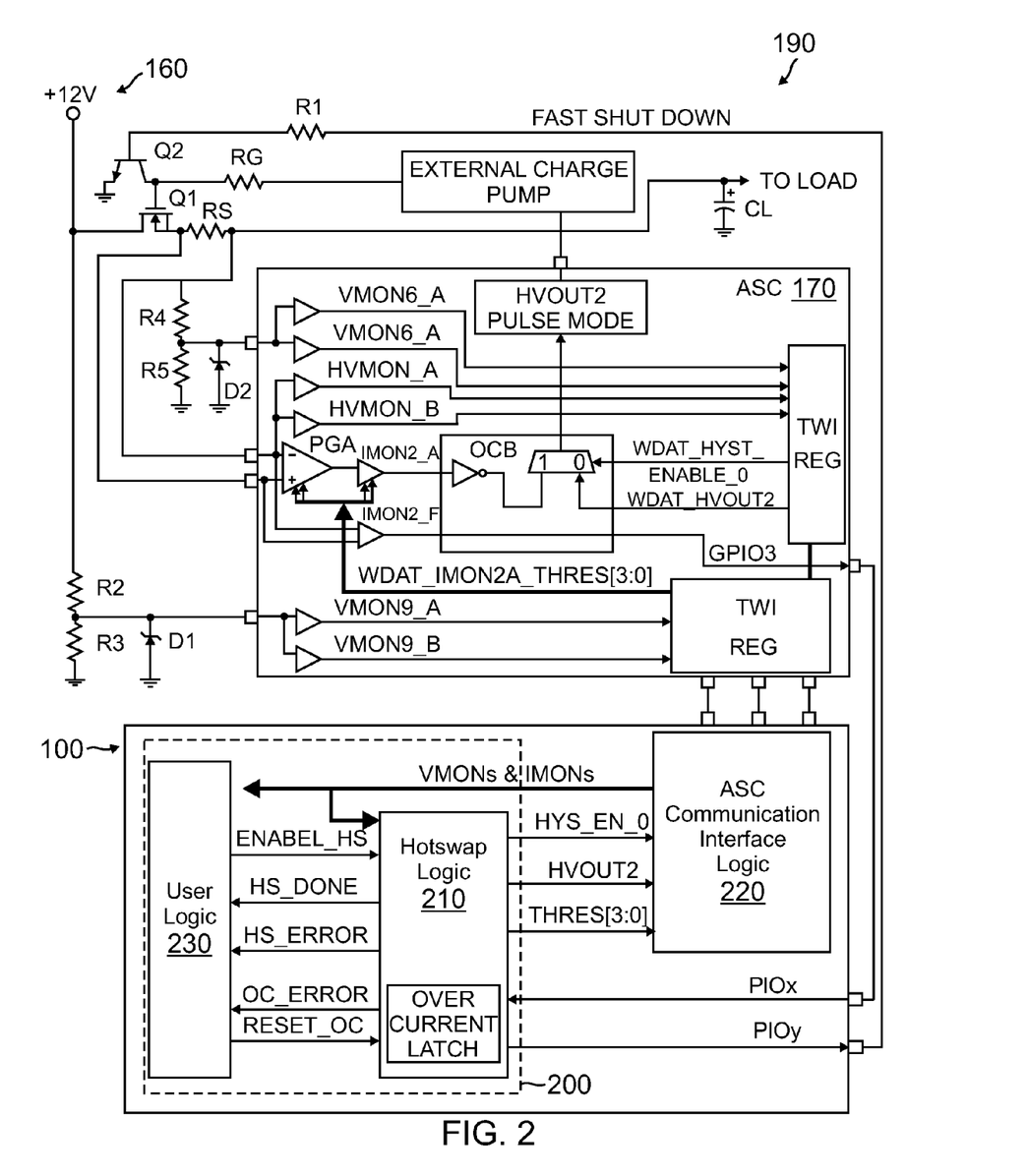
FIG. 2 illustrates a block diagram of an electronic assembly with hotswap circuit components in accordance with an embodiment of the disclosure.

FIG. 2 illustrates a block diagram of an electronic assembly with hotswap circuit components in accordance with an embodiment of the disclosure. As an example, the power supply backplane 160 is illustrated as a +12V power supply. The overall capacitive load of the electronic assembly 190 is represented as a capacitor $C_L$. A MOSFET transistor $Q_1$ is provided to selectively limit the in-rush current from the +12V power supply 160. When the electronic assembly 190 is connected or plugged into the power supply 160, the capacitive load $C_L$ of the electronic assembly 190 may act like a short circuit that draws an in-rush current from the power supply 160. The MOSFET transistor $Q_1$ may limit the in-rush current flowing into the electronic assembly 190. For example, the MOSFET transistor may be biased to adjust the drain to source resistance (e.g., to selectively open/close, switch on/off, and/or otherwise control the transistor).

A sensing resistor $R_S$ is provided in which the current through the MOSFET transistor $Q_1$ may be detected and monitored. In some embodiments, a MOSFET with a proportional current sensing source pin (Sense-FETs) may be utilized to detect current. The analog sense and control (ASC) device 170 may include various current and/or voltage sensors configured to detect and/or monitor currents or voltages. For example, as shown in FIG. 2, the voltage drop across sensing resistor $R_S$ is amplified by a programmable gain amplifier PGA and is monitored by a voltage comparator IMON2_A. Based on the current detected through the sensing resistor $R_S$, the MOSFET transistor $Q_1$ may be controlled to limit the in-rush current. This forms a hysteretic control loop to continuously detect the in-rush current and control the MOSFET transistor $Q_1$ to limit the in-rush current.

For example, if the in-rush current detected at the sensing resistor $R_S$ is less than a current trip point IMON2_A, the MOSFET transistor $Q_1$ is biased by the HVOUT2 with an external charge pump to turn on. As the MOSFET transistor $Q_1$ is turning on, the current detected at the sensing resistor $R_S$ may increase and may exceed the current trip point at IMON2_A. The bias on the gate of MOSFET transistor $Q_1$ is then lowered to decrease the current. As such, the hysteretic control loop allows the current to stay relatively constant by continuously monitoring the current and continuously adjusting the bias on the gate of the MOSFET transistor $Q_1$ to maintain the current.

The various current or voltage comparators, such as VMON_6A, VMON_6B, HVMON_A, HVMON_B, IMON2_A, and IMON2_F, may be provided to detect different voltage or current trip points. This may allow the hotswap process to have multiple phases. Each phase may have an unique set of voltage and current trip points. For example, the circuit components shown in FIG. 2 may allow a hotswap process of up to four phases, e.g., four sets of voltage/current trip points. Thus, the hysteretic control loop may transition through the phases as the capacitive load $C_L$ of the electronic assembly 190 is charged up during the hotswap process.

The phases and their respective trip points may be selected based on a Safe Operating Area (SOA) of the MOSFET transistor $Q_1$. This may ensure that the MOSFET transistor $Q_1$ is operating under the SOA to prevent damages to the MOSFET transistor $Q_1$ caused by excessive current or voltage. The various current or voltage comparators may be provided within the ASC 170, as shown in FIG. 2. In some embodiments, external current or voltage comparators may be provided separately from the ASC 170.

The PLD 100 may include programmable logic blocks 104 and hard intellectual property core (IP) blocks 160 that provide logic functionality of a hotswap controller. For example, the PLD 100 may include a User logic 230 and a Hot Swap Logic 210 that serve as respective components of a hotswap controller 200. The PLD 100 also may include an ASC communication interface logic 220 that services as a communication interface between the PLD 100 and the ASC 170.

The various voltage and/or current conditions detected by the sensors are communicated to hotswap controller 200 which then may implement the hotswap process based on the voltage and/or current conditions detected by the sensors. For example, as shown in FIG. 2, the voltage and current sensors may generate sensor signals based on the voltage and/or current conditions. The sensor signals are collected at registers, such as Three Wire Interface (TWI) registers. The sensing signals are then communicated to the ASC communication interface logic 220 and then forwarded to the User logic 230 and a Hotswap Logic 210 at the PLD 100. The Hotswap Logic 210 may gather the sensor signals from the voltage or current sensors and may control various hotswap operations.

In an embodiment, the Hotswap Logic 210 may report status to the User logic 230 and receive commands from the User logic 230. The Hotswap Logic 210 may start operating after User logic enables the hotswap process by asserting an "hs_enable" signal. The Hotswap Logic 210 may report hotswap error, over-current error, and hotswap complete status to the User logic 230. The "hs_enable" signal is canceled by the User logic upon receiving one of the error status from the Hotswap Logic 210 to stop the hotswap process. The completion of the hotswap process, whether successful or not, may be indicated by the cancellation of the "hs_enable" signal from the User logic 230.

During the hotswap process, Hot-swap error (hs_error) may occur when a load voltage of the electronic assembly 190 does not reach a desired level within a specified amount of time, indicating there is a problem with the hotswap process. Timers may be used in the hot-swap process to monitor the board behavior. Usually voltage gradually increases to a desired level on the load capacitor $C_L$ during the hotswap process. If this doesn't happen in a specified time period, it is possible that there is a short circuit on the electronic assembly 190. If the hotswap process lasts for an excessive amount of time, the MOSFET $Q_1$ may be damaged due to the heat generated from the operation. Thus, when the User logic 230 receives the "hs_error" signal, the User logic 230 may turn off HVOUT2 and may initiate a timer to allow the MOSFET $Q_1$ to cool down. The "hs_error" signal is cleared upon the de-assertion of the "hs_enable" signal from the User logic 230 and when the cool down timer expires. Further, the Hotswap Logic 210 may issue a "hs_done" signal to the User logic 230 to indicate the successful completion of a hotswap process when the load voltage of the electronic assembly 190 is stabilized at the desired level.

The Hotswap Logic 210 may report an over-current error to the User logic 230 upon the detection of a short-circuit condition by issuing an "oc_error" signal to the User logic 230. The single-bit over-current error signal "oc_error" indicates that a current limit has been exceeded. This current limit is usually far in excess of the current limits used in the hotswap process. For example, after the hotswap process is completed, a short-circuit condition may occur when there is a device failure during normal operation of the electronic assembly 190. As shown in FIG. 2, the Hotswap Logic 210 provides a fast shut-down mechanism when over current is detected in a short-circuit condition during or after the hotswap process. During the fast shut-down process, the short-circuit condition is detected by sensor IMON2_F. In response, the Hotswap Logic 210 may control a transistor $Q_2$ to quickly turn off the MOSFET transistor $Q_1$.

The Hotswap Logic 210 may provide a base timer of 10 ms. This 10 ms timer corresponds to the single pulse width of the MOSFET 10 ms SOA curve. Depending on the characteristic of the MOSFET transistor $Q_1$, the hotswap controller 200 may have timers of variable length up to 2 seconds for use with the MOSFET DC SOA curve.

Figure 3:
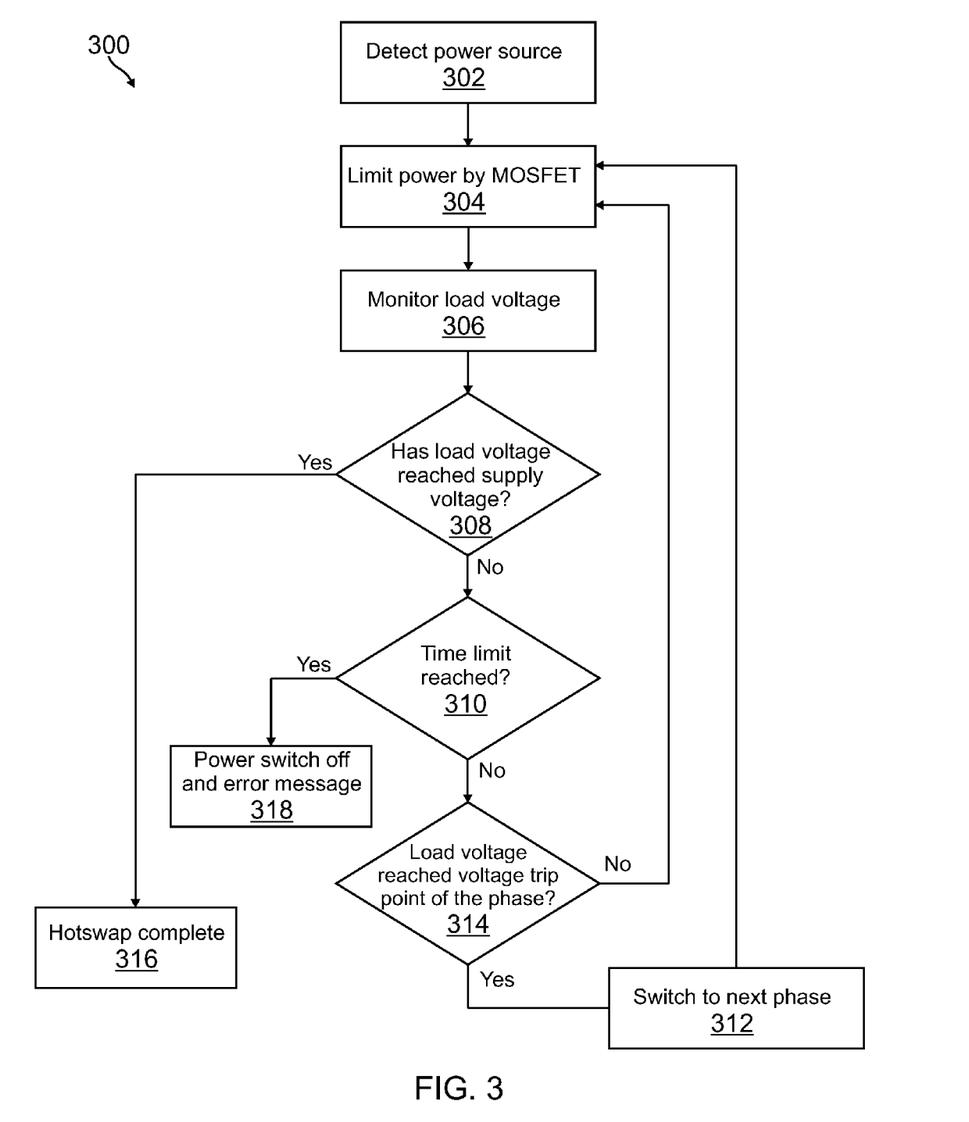
FIG. 3 illustrates a hotswap process for an electronic assembly in accordance with an embodiment of the disclosure.

FIG. 3 illustrates a hotswap process 300 for an electronic assembly in accordance with an embodiment of the disclosure. For example, the process of FIG. 3 may be performed when the electronic assembly 190 is connected to the power supply backplane 160 to limit the in-rush current drawn by the capacitive load $C_L$ of the electronic assembly 190.

In operation 302, hotswap controller 200 may detect that the electronic assembly 190 is connected to a live, power source, such as power supply backplane 160. For example, the connection to the power source may be detected by a voltage sensor, such as voltage comparators VMON9_A or VMON9_B. In response, the hotswap controller 200 may begin the hotswap process of limiting the in-rush current from the power source.

In operation 304, the hotswap controller 200 may control the MOSFET transistor $Q_1$ to limit the in-rush current. For example, the hotswap controller 200 may control HVOUT2 to adjust the bias on the gate of the MOSFET transistor $Q_1$ to limit the in-rush current flowing into the electronic assembly 190. In operation 306, the hotswap controller 200 may monitor the load voltage, such as the voltage across the capacitive load $C_L$. For example, the load voltage may be monitored by voltage comparators HVMON_A, HVMON_B, $VMON6_A$, and $VMON6_B$. Each voltage comparator has a voltage trip point at which the voltage comparator outputs a sensor signal indicating that the voltage trip point has been reached. As shown in FIG. 2, four voltage comparators are implemented to provide four voltage trip points for a hotswap process of up to four phases.

In other embodiments, the number and composition of voltage comparators may vary to provide different number of phases with different voltage/current trip points based on the design requirements of the electronic assembly and the power supply. For example, for lower voltage power supplies, a hotswap process with one or two phases may be implemented. For higher voltage power supplies, a hotswap process with four to six phases may be implemented.

In operation 308, the hotswap controller 200 may determine whether the load voltage has reached the supply voltage. For example, in FIG. 2, the hotswap controller 200 may determine whether the load voltage has reached the supply voltage of +12V. If the load voltage has reached the supply voltage indicating that the capacitive load $C_L$ of the electronic assembly 190 has been charged up, the hotswap controller 200 may determine that the hotswap operation has been completed at operation 316 and a stabilized voltage and current are supplied to the electronic assembly 190 from the power source 160 moving to operation 316.

If the load voltage has not reached the supply voltage in operation 308, the process may continue to operation 310 in which the hotswap controller 200 may determine whether a time limit has been reached. For example, a phase may be repeated to allow a large capacitance to reach the required voltage for the next phase. If the time limit has been reached, the hotswap controller 200 may switch off the power supply and present an error message to the user in operation 318 to prevent overheating to the MOSFET transistor $Q_1$. In some embodiments, the hotswap controller 200 may temporarily suspend the hotswap operation to cool down the MOSFET transistor $Q_1$. The length of cool down period is determined during the design stage based on the MOSFET characteristic. The same cool down period may be used for all phases within a hotswap process.

If the time limit has not been reached, the hotswap controller 200 may determine whether the load voltage has reached the voltage trip point of the present phase in operation 314. As noted above, each phase has a voltage trip point as defined by the voltage comparator assigned for the phase. If the load voltage has not reached the voltage trip point, the hotswap controller 200 may repeat the present phase by proceeding to operation 304. Each phase has a voltage trip point and a current limit corresponding to the voltage trip point, as determined based on the MOSFET transistor $Q_1$'s SOA. If the present phase is repeated, the hotswap process continues to charge the capacitive load $C_L$ under the same current limit as defined in the present phase.

For a hotswap process using a DC SOA curve, the steps of repeating the same phase and cool down period may not apply. Instead, a time limit longer than 10 ms is used for each phase. If the load voltage does not get to the desired level when the timer expires, a hotswap error occurs and the hotswap process is terminated.

If the load voltage has reached the voltage trip point of the present phase in operation 314, the hotswap controller 200 may transition to the next phase in operation 312. The next phase may have a new voltage trip point and a new current limit by which the MOSFET transistor $Q_1$ limits the in-rush current.

The hotswap process may transition through multiple phases, with some or all of the phases repeated. By monitoring the current and voltage conditions of the load, the hotswap controller 200 may implement the appropriate phase to control the MOSFET transistor $Q_1$ within the SOA of the MOSFET Transistor $Q_1$. This hysteresis control loop allows for a smaller and/or cheaper MOSFET to be used for the hotswap operation.

Figure 4:
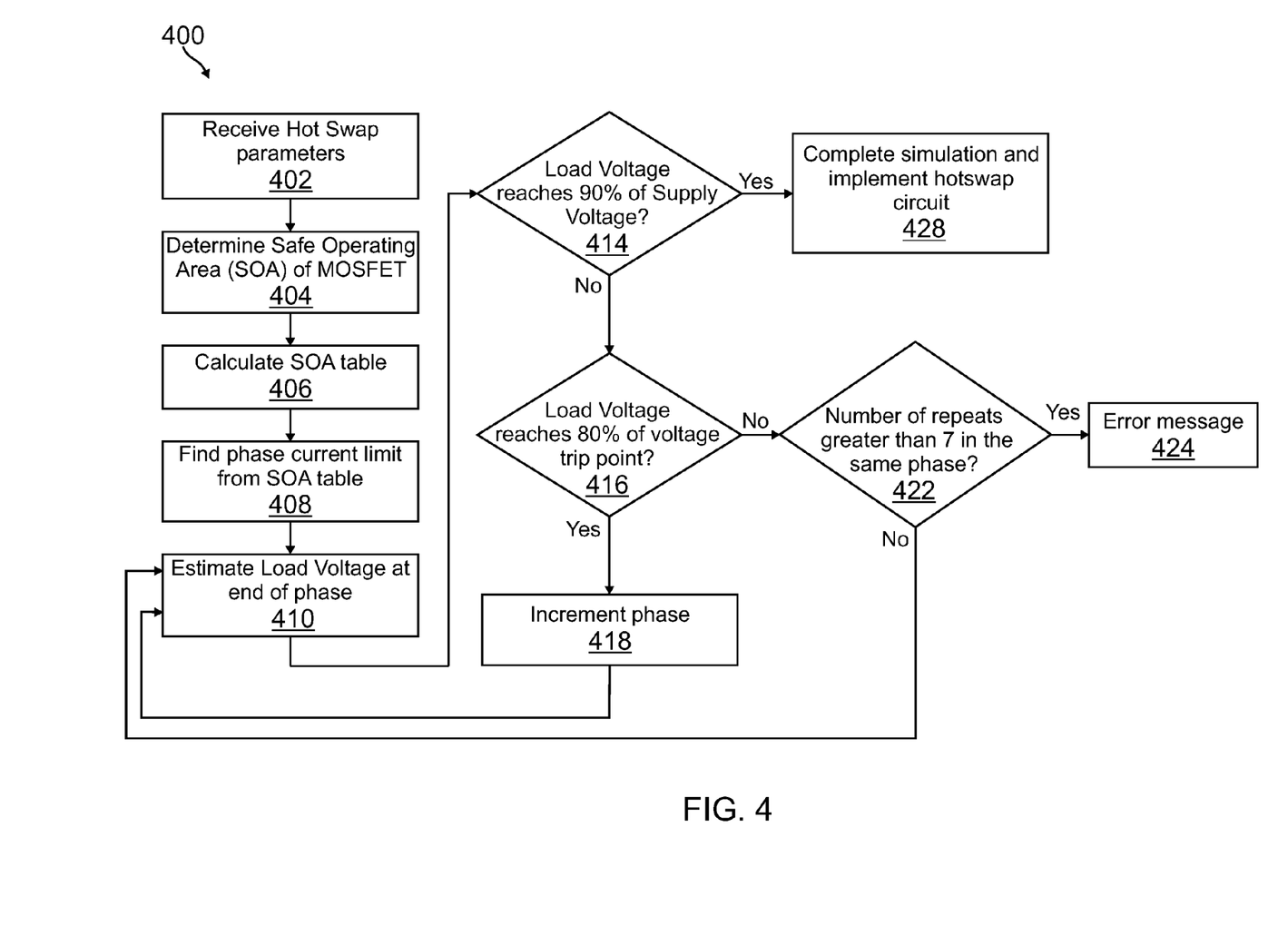
FIG. 4 illustrates a hotswap setup process for an electronic assembly in accordance with an embodiment of the disclosure.

FIG. 4 illustrates a hotswap setup process 400 for an electronic assembly in accordance with an embodiment of the disclosure. In particular, before a hotswap operation of the electronic assembly 190 is implemented, a user may design and configure the hotswap operation, such as determining a number of phases needed and the respective voltage trip points and current limits of the phases, based on various hotswap parameters, such as a capacitive load of the electronic assembly, a supply voltage of the power source, a type of MOSFET transistor used for limiting the in-rush currents, and the like.

Figure 5:
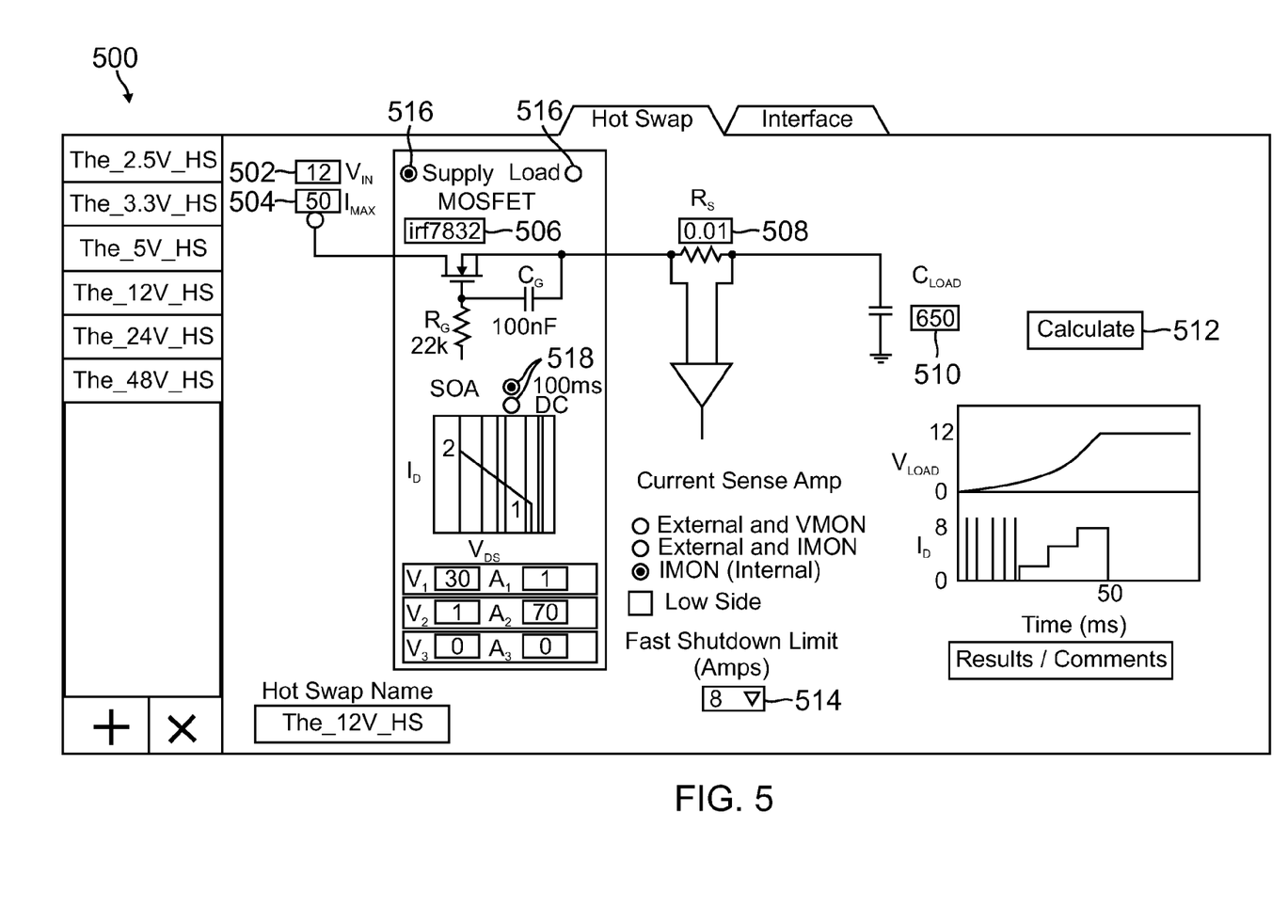
FIG. 5 illustrates a user interface for hotswap setup for an electronic assembly in accordance with an embodiment of the disclosure.

In an embodiment, a user interface for setting up hotswap operations may be provided by the external system 130. The external system 130 may program and configure the hotswap operations of the electronic assembly 190. For example, the user interface 135 of the external system 130 may display a user interface 500 for setting up hotswap operations, as shown in FIG. 5. In operation 402, the external system 130 may receive hotswap parameters from a user via user interface 500.

User interface 500 may include various data input fields for receiving the user's entry of hotswap parameters. For example, as shown in FIG. 5, a hotswap name of "The_12V_HS" is used for this particular hotswap design. The external system 130 may store various hotswap designs which may be selected to be implemented for different electronic assemblies. An input field 502 is provided for receiving the input voltage $V_{IN}$. The input voltage $V_{IN}$ represents the supply voltage from the back-plane power source 160 and may be used to calculate a number of phases of the hotswap process.

An input field 504 is provided for receiving the maximum current $I_{max}$ the input source can supply. An input field 506 is provided for receiving a name or type of the MOSFET. In the example as shown in FIG. 5, a MOSFET model name or type "irf7932" is entered in input field 506. The external system 130 may have a database storing information of various types and models of MOSFET. When a MOSFET is selected or entered in input field 506, the user interface 500 may display a current-voltage graph depicting the safe operating area of the selected or entered MOSFET. In some embodiments, the user may input one or more data points of the SOA of the MOSFET and may select DC or 10 ms curve, as shown in FIG. 5.

An input field 508 is provided for receiving a resistance value of a current sensing resistor $R_S$. An input field 510 is provided for receiving a value of the capacitive load $C_{LOAD}$ of the electronic assembly. An input field 514 is provided for receiving a current limit at which the fast shutdown is triggered.

There are two upper radio buttons 516 within the MOSFET box to allow the user to place the MOSFET at either the Supply or the Load. The interface dynamically change based on the button selected. There are two lower radio buttons 518 within the MOSFET box for selecting whether the SOA data is for the 10 ms or the DC curve.

The Fast Shutdown Limit 514 has a drop-down list that is calculated depending on the current sense amplifier radio buttons along with the gain, current sense resistor value, and the trip points of the available current and voltage sensors, e.g., IMONs and/or VMONs.

Resistor $R_G$ and capacitor $C_G$ form a low-pass filter to prevent the MOSFET from overshoot and oscillation. The time constant is significantly longer than an "optimized" gate resistor would provide, so that MOSFET parasitic oscillations are limited. The 220 us time constant is slower than the current and/or voltage sensors' sampling times to prevent any MOSFET from "over correcting." A "calculate" button 512 may be pressed by the user after the hotswap parameters have been entered.

Figure 6:
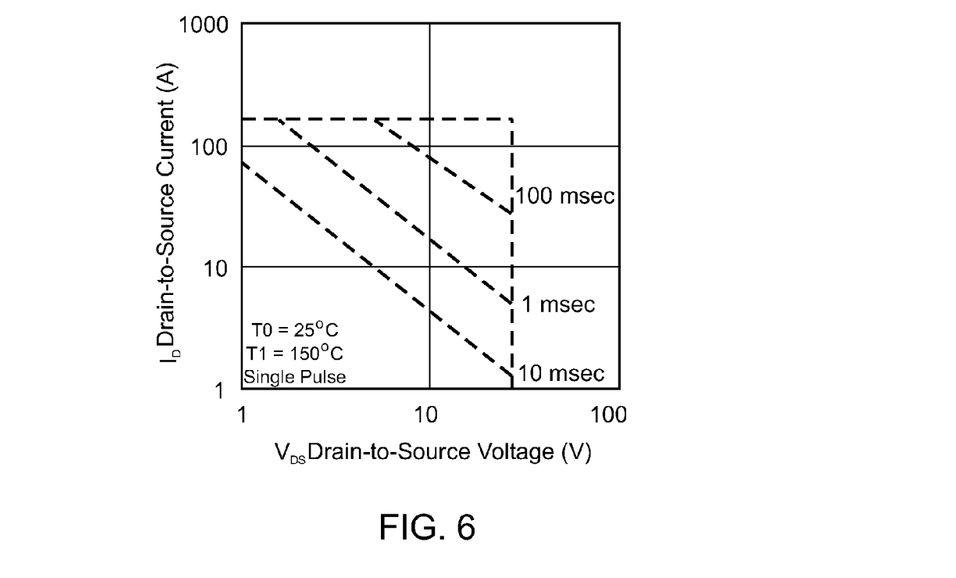
FIG. 6 is a graph indicating safe operation areas (SOA) of a MOSFET in accordance with an embodiment of the disclosure.

In operation 404, after the user presses the "calculate" button 512, the external system 130 may first determine the safe operating area of the selected MOSFET. Based on the model and/or name of the selected MOSFET, the external system 130 may retrieve specification of the selected MOSFET including the SOA limit curve, as shown in FIG. 6. The curves shown in FIG. 6 appear as straight lines (with a negative slope) because both the vertical and horizontal axis are log based. The key section of the curve for the Hot Swap algorithm may be represented by the following equation, which expresses the relationship between Voltage (V) and Current (A).

$$A=mV^{-b}$$

The constants m and b may vary based on the MOSFET selected and may be solved for using two known data points on the limit curve, such as $(V_1, A_1)$ And $(V_2, A_2)$, as shown in FIG. 5. For example, $$b = \frac{\ln(A_2) - \ln(A_1)}{\ln(V_1) - \ln(V_2)}$$

$$m = \frac{A_1}{V_1^{-b}}$$

After solving for b and m, the equation for 10 ms SOA limit for the irf7832 MOSFTET is:

$$A = 70V^{-1.249}$$

In operation 406, the equation for SOA limit of the MOSFET then may be used to calculate the SOA table for the MOSFET. Based on the current sensing resistor value and the available current sensors in the electronic assembly and their respective current trip points, the SOA table may be established using the SOA limit equation. In some embodiments, the MOSFET may have a SOA curve with multiple segments with different slopes. As such, each of the different slopes of the segments may be calculated to fill the SOA table.

Figure 7:
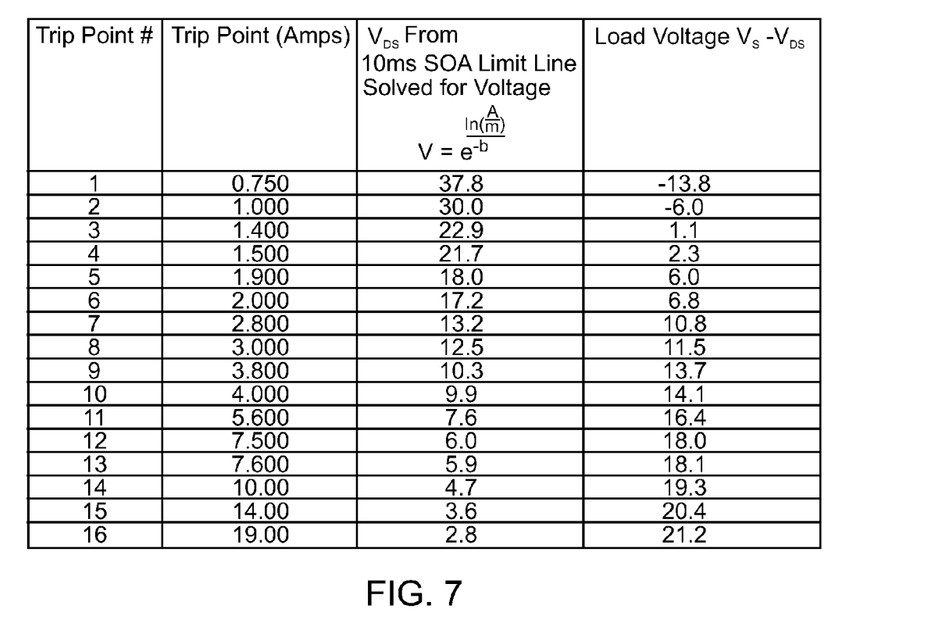
FIG. 7 is a table indicating SOA of a MOSFET in accordance with an embodiment of the disclosure.

As shown in FIG. 7, a list of current trip points of the current sensors is presented in a left column of the SOA table. In particular, the user supplied value of current sensing resistor ($R_S$) of 0.01 ohms provides the basis of the current trip points that are listed in the first column of the SOA table. The Drain-to-Source voltages $V_{DS}$ are calculated for the respective current trip points using the above 10 ms SOA limit equation. The Load Voltages $V_{LOAD}$ is calculated based on the difference between the supply voltage (+24V) $V_S$ and the voltage drop across MOSFET $V_{DS}$.

Next, the external system 130 may simulate the charging up of the capacitive load $C_{LOAD}$ of the electronic assembly 190 during the hotswap process. In the initial state, the load voltage $V_{LOAD}$ is zero, as the electronic assembly 190 has not been powered and the capacitive load $C_{LOAD}$ has not been charged up yet. As such, to determine the current limit for the initial phase or phase 1, the external system 130 may reference the Load Voltage column in the SOA table, as shown in FIG. 7, and find the negative value closest to zero. The corresponding Trip Point value is the current limit for Phase 1. The external system 130 may designate this as the starting Hotswap current limit when the full supply voltage is across the MOSFET. For the example, as shown in the SOA table in FIG. 7, the current limit is 1 ampere; thus, this current limit will be used for the initial phase or Phase 1.

During each phase of the hotswap process, the load voltage $V_{LOAD}$ on the load capacitor ($C_{LOAD}$) will increase, assuming there are no errors. The increase in Voltage at the load means less Voltage is dropping across the MOSFET and more current can be used to charge the capacitive load in the next phase (moving down the SOA Table). In operation 410, the load voltage increase for each phase is calculated using the following equation, where n is the number of times the phase is repeated, I is the current trip point in Amps, and t is the phase time in seconds.

$$\Delta V = \frac{n * I * t}{C_{LOAD}}$$

The first step is to use the above equation with n=1 and t=0.01 s where I comes from the SOA Trip Point Table and $C_{LOAD}$ is entered by the user. If the computed voltage increase is less than the next Load Voltage value from the table, then the phase has to be repeated. Generally this is the case when $C_{LOAD}$ is very large. The followings are examples for calculating voltage increase with different hotswap parameters:

$C_{LOAD}$=390 uF, I=1 A: ΔV=25.6V    Example 1

The Voltage increase of 25.6V exceeds the supply voltage of +24V so the hotswap process is complete using Phase 1 only once. The target voltage limit for Phase 1 is simply the 90% value of the supply voltage which is 21.6V. In some embodiments, the 90% threshold may be adjusted based on the accuracy of the power supply used.

$C_{LOAD}$=1,000 uF, I=1 A: ΔV=10.0V    Example 2

The voltage increase of 10V is significant enough that Phase 1 does not need to be repeated. The target voltage that determines the end of Phase 1 is 80% of the calculated voltage increase which is 8V. The reduced voltage takes into consideration the tolerance of the load capacitor and the accuracy of the current trip point. Using the 8V target voltage look down the SOA table and find the load voltage value just below it, which is 6.8V and corresponding to 2 Amps. As such, the current trip point for the next phase is 2 Amps.

$C_{LOAD}$=20,000 uF, I=1 A: ΔV=0.50V    Example 3

The voltage increase of 0.50V is less than the very next value (1.1V) in the SOA table. Thus Phase 1 needs to be repeated in order to raise the load voltage enough to move on to the next Phase. When a phase is repeated, it may be repeated up to eight (8) times. Using the above equation, the load voltage should be 4.0V after Phase 1 has been repeated eight times. The target voltage for Phase 1 is 80% of 4.0V which is 3.2V. The load Voltage that is just under the 3.2V increase is 2.3V, which correspond to the current trip point of 1.5 Amps. As such, the current limit for the next phase is 1.5 Amps.

$C_{LOAD}$=100,000 uF, I=1 A: ΔV=0.10V    Example 4

The voltage increase of 0.10V is too small and Phase 1 would have to be repeated 11 times in order to raise the voltage at the load to 1.1V (the very next table entry). Assuming that the algorithm limits each phase to be repeated 8 times, the external system 130 may flag this as an error and notify the user to use a different MOSFET or change the size of the load capacitor.

Thus, the above equations allow the external system 130 to simulate the hotswap process for charging up the capacitive load. As shown in FIG. 4, in operation 410, the external system may estimate the load voltage at the end of a phase. In operation 414, the external system 130 may determine whether the load voltage has reached 90% of the supply voltage. If the load voltage has not reached 90% of the supply voltage, the external system may determine whether the load voltage has reached 80% of the voltage trip point of the present phase in operation 416. If so, the external system may increment to the next phase in operation 418 by referencing the SOA table to find the next voltage and current trip points. The process then may return to operation 410 to estimate the load voltage for this next phase.

If the load voltage has not reached 80% of the voltage trip point of the present phase in operation 416, the external system 130 may determine whether the present phase has been repeated more than 7 times in operation 422. If the present phase has been repeated for more than 7 times, the external system 130 may issue an error message to the user and may suggest that the user select a different MOSFET or choose different hotswap parameters in operation 424. If the present phase has not been repeated for more than 7 times in operation 422, the external system 130 may repeat the present phase by returning to operation 410.

Accordingly, the hotswap process may transition through multiple phases with certain phases being repeated. When the load voltage reaches 90% of the supply voltage in operation 414, the external system 130 may determine that the hotswap is completed in operation 428. The external system 130 may then determine how many phases have been used during the simulation and their respective voltage and current trip points. After finalizing the design, the external system 130 may use the design information to configure the electronic assembly 190 for hotswap operations. For example, the external system 130 may select and set up current and/or voltage sensors based on the phases used and their respective trip points. The external system 130 also may route and connect various circuit components according to the design to implement the hotswap operations.

The above process 400 may allow a user to design and configure the hotswap operation of an electronic assembly. In particular, the user may select a particular MOSFET and enter various hotswap parameters. The external system 130 may then simulate and calculate the hotswap operation to determine the phases required and their respective voltage/current trip points based on the user's design input. The hotswap process may transition through multiple phases, each with its own voltage and current limits, as determined based on the selected MOSFET's SOA. This may allow the electronic assembly to use a smaller and/or cheaper MOSFET to implement the hotswap operation.

Where applicable, various embodiments provided by the present disclosure can be implemented using hardware, software, or combinations of hardware and software. Also where applicable, the various hardware components and/or software components set forth herein can be combined into composite components comprising software, hardware, and/or both without departing from the spirit of the present disclosure. Where applicable, the various hardware components and/or software components set forth herein can be separated into sub-components comprising software, hardware, or both without departing from the spirit of the present disclosure. In addition, where applicable, it is contemplated that software components can be implemented as hardware components, and vice-versa.

Software in accordance with the present disclosure, such as program code and/or data, can be stored on one or more non-transitory machine readable mediums. It is also contemplated that software identified herein can be implemented using one or more general purpose or specific purpose computers and/or computer systems, networked and/or otherwise. Where applicable, the ordering of various steps described herein can be changed, combined into composite steps, and/or separated into sub-steps to provide features described herein.

Embodiments described above illustrate but do not limit the invention. It should also be understood that numerous modifications and variations are possible in accordance with the principles of the present invention. Accordingly, the scope of the invention is defined only by the following claims.

What is claimed:

1. A system comprising:
an electronic assembly with a capacitive load;
a transistor configured to selectively allow and restrict an in-rush current from a power supply to the electronic assembly;
a current sensing device configured to detect the in-rush current from the power supply; and
a hotswap controller configured to control the transistor to limit the in-rush current based on the in-rush current detected by the current sensing device, such that the capacitive load of the electronic assembly is charged up gradually, wherein
the hotswap controller is configured to control the transistor through a plurality of phases as the capacitive load is charged up, each of the plurality of phases having a voltage limit and a current limit, and
when a voltage or a current detected at the transistor reaches a first voltage limit or a first current limit of a first phase, the hotswap controller is configured to transition from the first phase to a second phase of the plurality of phases, which has a respective voltage limit and current limit, and at least one of the voltage and current limit of the second phase is different than a corresponding voltage and current limit of the first phase.

2. The system of claim 1, wherein the transistor is a MOSFET and the controller is configured to adjust a bias on the MOSFET based on a Safe Operation Area of the MOSFET.

3. The system of claim 1, wherein a number of phases is determined based on one or more of a type of the transistor, an input voltage of the power supply, the capacitive load of the electronic assembly, and an in-rush current limit.

4. The system of claim 1, wherein the current sensing device comprises a current sensing resistor and a voltage comparator configured to measure a voltage across the current sensing resistor, and wherein the in-rush current is determined based on the voltage across the current sensing resistor and a resistance of the current sensing resistor.

5. The system of claim 1, further comprising a plurality of voltage sensing devices each corresponding to one of the plurality of phases and configured to detect the voltage limit of the corresponding phase.

6. The system of claim 1, wherein the controller is further configured to turn off the transistor when a time limit or a phase limit is reached and the capacitive load is not charged.

7. The system of claim 1, wherein the controller is further configured to maintain the transistor on when the capacitive load is fully charged.

8. A method comprising:
detecting that a load has been connected to a power supply;
biasing a gate of a transistor coupled between the power supply and the load by an initial voltage to limit an in-rush current from the power supply to the load;
monitoring a load voltage of the load;
determining whether the load voltage reaches a first voltage trip point;
increasing a current limit at the transistor in response to the load voltage reaching the first voltage trip point;
determining whether the load voltage reaches a supply voltage of the power supply;
determining whether the load voltage reaches a second voltage trip point; and
increasing the current limit at the transistor in response to the load voltage reaching the second voltage trip point if the load voltage has not reached the supply voltage.

9. The method of claim 8, wherein the first voltage trip point, the second voltage trip point, and the current limit are set based on a Safe Operating Area of the transistor.

10. The method of claim 8, further comprising biasing the transistor through a plurality of phases, wherein each of the plurality of phases has a corresponding set of voltage trip points and current limits.

11. The method of claim 8, further comprising:
   determining whether the in-rush current exceeds an over-current limit; and
   biasing the transistor to disconnect the power supply from the load in response to the in-rush current exceeds the over-current limit.

12. The method of claim 11, further comprising notifying a user when the in- rush current exceeds the over-current limit.

13. The method of claim 8, further comprising:
   determining whether the load voltage reaches the supply voltage within a predetermined time; and
   temporarily suspending biasing of the transistor when the load voltage does not reach the supply voltage within the predetermined time.

14. A system comprising:
   a processor; and
   a memory adapted to store a plurality of computer readable instructions which when executed by the processor are adapted to cause the system to perform a method comprising:
   receiving parameters associated with hotswap operations for an electronic assembly with a capacitive load;
   determining, based on the parameters, a plurality of phases to charge the capacitive load of the electronic assembly with a power supply having a given supply voltage through a transistor configured to limit an in-rush current drawn by the capacitive load from the power supply, wherein each of the plurality of phases is associated with a respective voltage and current limit that maintains the transistor within a Safe Operating Area (SOA) indicating safe voltage and current conditions within which the transistor operates; and
   producing a configuration for a hotswap circuit to implement the plurality of phases for hotswapping the electronic assembly at the power supply.

15. The system of claim 14, wherein the method further comprises:
   determining an SOA table based on the SOA of the transistor and current or voltage sensing ranges of current or voltage sensing devices available to the electronic assembly, the SOA table listing available phases for hotswapping with voltage or current limits for each available phase; and
   selecting an initial phase from the available phases, the initial phase having a voltage limit close to zero.

16. The system of claim 15, wherein the method further comprises:
   determining a load voltage at an end of a present phase;
   determining whether the load voltage reaches a voltage limit of the present phase; and
   transitioning to a next phase when the load voltage reaches the voltage limit of the present phase.

17. The system of claim 16, wherein the method further comprises repeating the present phase when the load voltage has not reached the voltage limit of the present phase.

* * * * *